B. HOLLY.
METER-VALVES OF APPARATUS FOR WARMING DWELLINGS, &c.
No. 193,087. Patented July 17, 1877.
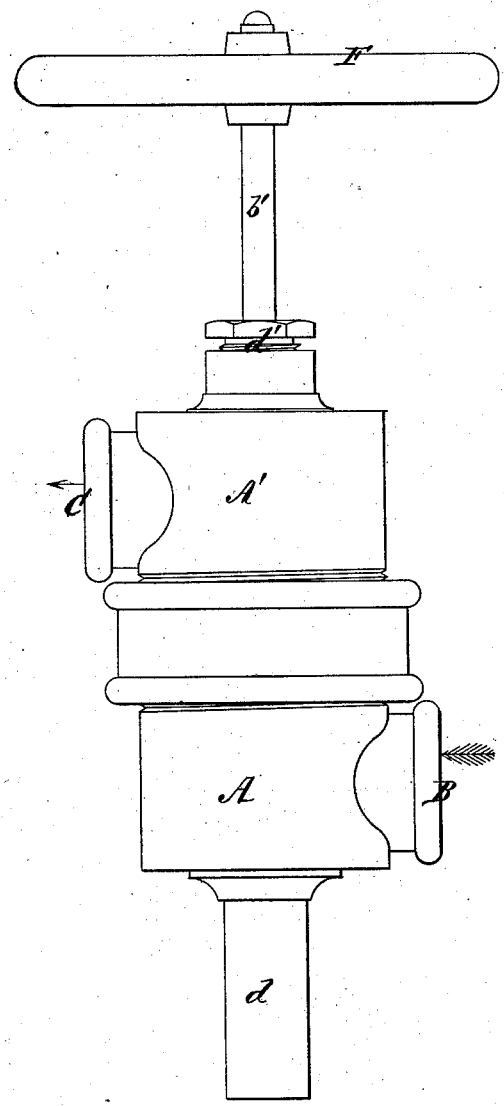
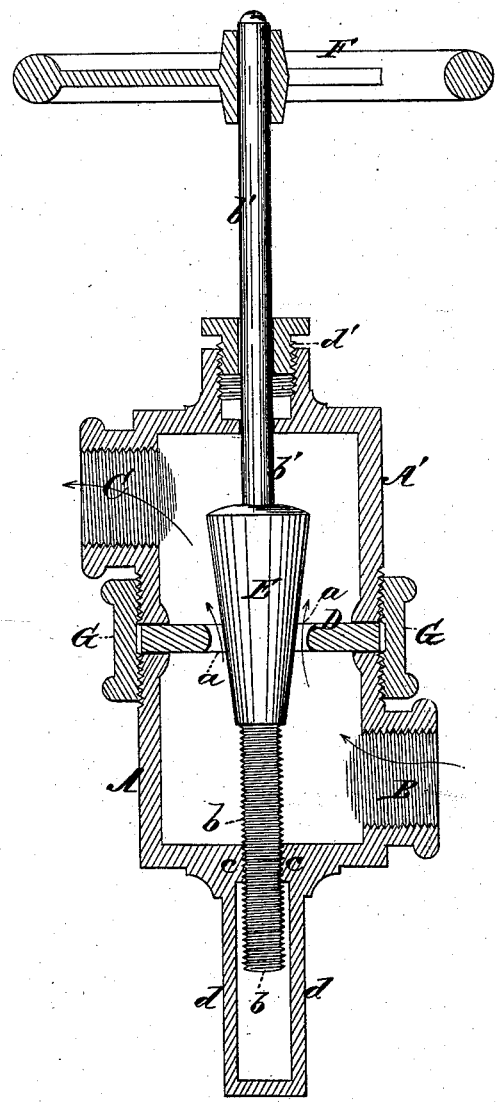

UNITED STATES PATENT OFFICE.

BIRDSILL HOLLY, OF LOCKPORT, NEW YORK.

IMPROVEMENT IN METER-VALVES OF APPARATUS FOR WARMING DWELLINGS, &c.

Specification forming part of Letters Patent No. 193,087, dated July 17, 1877; application filed May 14, 1877.

CASE D.

*To all whom it may concern:*

Be it known that I, BIRDSILL HOLLY, of Lockport, in the county of Niagara and State of New York, have invented a new and useful Improvement in Meter-Valves of Apparatus for Warming Districts of Dwellings with Steam or Heated Fluids; and I do hereby declare that the following is a full, clear, and exact description of the same, reference being had to the accompanying drawings, forming part of this specification, in which—

Figure 1 is a plan view of my improved meter-valve; Fig. 2, a horizontal section of the same.

This invention relates specially to the meter-valve described in my application for a patent for an apparatus for warming districts of dwellings, and designated as "Case A," and filed on an even date herewith.

The nature of my invention consists in a cone valve-plug, arranged to move back and forth through an annular diaphragm of a cylinder which has an inlet-passage in one side of the diaphragm and an outlet on the opposite side of the same, whereby the passage of steam from one side of the diaphragm to the other can be controlled, so as to have various pressures at will on the outlet side of the diaphragm while the pressure on the inlet side remains unchanged.

My invention consists, second, in a meter-valve having its chamber or cylinder in which its valve-plug works made in two sections transversely, and with an annular diaphragm confined between the coupled ends of the two sections, by means of a screw-ring or other equivalent device, whereby a removable diaphragm may be employed, and said diaphragm may be of a different material from that of which the cylinder is made, which different material may be of hard rubber, glass, or other durable substance, which will not be so readily cut away by the steam, and less liable to cause a loud hissing noise, such as might be produced when metal is used.

In the accompanying drawing, A A′ represents a metal valve-cylinder, with an inlet, B, and an outlet, C, for steam or other substance to pass through. D is the diaphragm, with a flaring passage, $a$, through its center. E is a cone-valve plug, arranged to work longitudinally through the passage $a$ of the diaphragm. The largest diameter of this cone-valve plug just closes the passage $a$, and the smallest diameter just opens it to its full capacity of discharge. The cone-valve plug has a screw-threaded stem, $b$, on one end and a plain stem, $b'$, on the other, and these stems are respectively supported by the cylinder A A′. The screw-stem passes through a nut, $c$, of a tubular closed extension, $d$, of the part A of the valve-cylinder, and the plain stem passes through a stuffing-box, $d'$, of the part A′ of the said cylinder, and receives on its end a hand-wheel, F, or other device, by which the valve-plug is turned.

When the valve-plug stem is screw-threaded, as at $b$, the valve-plug E is moved longitudinally through its passage by giving it a rotary motion. If both stems were made plain the valve-plug might be moved longitudinally, without turning it, by any convenient mechanical appliance. The cone-valve plug, by being moved a greater or less distance in the passage $a$ of the diaphragm, lessens or increases the size of the annular space which is between the periphery of the cone-valve plug and the diaphragm, and thus controls the passage of the steam from one side to the other of the diaphragm to the nicest degree, and the steam, by being "wire-drawn" from one chamber to the other of the cylinder, and allowed to expand as soon as it enters the outlet-chamber of the cylinder, will have its degrees of pressure reduced to such an extent that high-pressure steam on one side of the diaphragm will, it is thought, become low-pressure steam on the opposite side.

The diameters of the cone-valve plug, along its length, will be made such, with reference to the diameter of the passage of the diaphragm and a scale or prepared chart, that the amount of steam, under a given pressure, passed through the diaphragm can at all times be known.

The valve-plug chamber, with diaphragm described, does not necessarily require to be made of three pieces, as shown, as the annular diaphragm might be simply an internal projection from a cylinder, A A′, cast in one piece, the same as is shown in my application "A," hereinbefore referred to; but I prefer to make the parts A A' separate from one another, and to make the diaphragm of a separate piece, and to confine said separate diaphragm between the coupled ends of the parts A A' by means of a screw ring-coupling, G, which screws upon screw-threads cut upon the ends of the parts A A', as shown.

By this manner of constructing the valve-plug chamber, the diaphragm can be made of a material such as hard rubber or glass, which will not readily cut out, and, also, will not produce a hissing noise when steam is flowing through it, and when repairs are necessary the parts of the valve-plug chamber can be separated and the worn diaphragm removed and replaced by a new one.

Having described my invention, what I claim as new, and desire to secure by Letters Patent, is—

1. The longitudinally-adjustable valve-plug, of cone form, which is applied to be uninfluenced by the direct pressure of the steam upon it within its chamber, in combination with a valve-chamber having a perforated diaphragm across it for the cone-plug to work in back and forth, and an inlet-passage between one end or head of the chamber and the said diaphragm, and an outlet-passage between the other end or head of the chamber and said diaphragm, whereby a suitable receiving-chamber on one side of the diaphragm for high-pressure steam is provided, and a like chamber for low-pressure steam on the other side of the diaphragm is also provided, and the passage of the steam, which is at high pressure, into pipes which are to conduct the steam at variant pressures, or at low pressure, is controlled, substantially as herein set forth.

2. The valve-plug chamber, made in two parts, and with its diaphragm confined between the ends of these parts by a coupling device, substantially as described.

Witness my hand in the matter of my application for a patent for an improvement in meter-valves of apparatus for warming districts of dwellings with steam or heated fluids, this 21st day of April, A. D. 1877.

BIRDSILL HOLLY.

Witnesses:
SAML. ROGERS,
I. H. BABCOCK.